United States Patent [19]

Gabbe et al.

[11] Patent Number: 4,459,658
[45] Date of Patent: Jul. 10, 1984

[54] TECHNIQUE FOR ENABLING OPERATION OF A COMPUTER SYSTEM WITH A CONSISTENT STATE OF A LINKED LIST DATA STRUCTURE AFTER A MAIN MEMORY FAILURE

[75] Inventors: John D. Gabbe, Little Silver; Matthew S. Hecht, Red Bank, both of N.J.

[73] Assignee: Bell Telephone Laboratories Incorporated, Murray Hill, N.J.

[21] Appl. No.: 352,556

[22] Filed: Feb. 26, 1982

[51] Int. Cl.³ .............................................. G06F 11/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,044,337 | 8/1977 | Hicks et al. | 364/200 |
| 4,075,693 | 2/1978 | Fox et al. | 364/200 |
| 4,084,231 | 4/1978 | Capozzi et al. | 364/200 |

OTHER PUBLICATIONS

"Physical Integrity in a Large Segmented Database", R. A. Lorie, ACM Transactions on Database Systems, vol. 2, No. 1, Mar. 1977, pp. 91-104.
"Notes on Data Base Operating Systems", J. Gray, Operating Systems—An Advanced Course, 1978, pp. 393-481.
"Recovery Techniques for Database Systems", J. Verhofstad, ACM Computing Surveys, vol. 10, No. 2, Jun. 1978, pp. 165-195.
Experiences with Processes and Monitors in Mesa", R. W. Lampson and D. D. Redell, CACM, vol. 23, No. 2, Feb. 1980, pp. 105-117.

Primary Examiner—Jerry Smith
Assistant Examiner—Mark P. Watson
Attorney, Agent, or Firm—Barry H. Freedman

[57] ABSTRACT

Operation of a computer system after a main memory failure is enabled by storing a read-only access shadow copy of its data structures in another memory having an independent failure mode. The shadow copy is periodically updated at a series of checkpoints. Where the data structure is a linked list, updating without recopying is enabled by prelinking the list item in the read-only list to the beginning of a second read/write list, which is appended to the first list at the next checkpoint.

15 Claims, 5 Drawing Figures

TECHNIQUE FOR ENABLING OPERATION OF A COMPUTER SYSTEM WITH A CONSISTENT STATE OF A LINKED LIST DATA STRUCTURE AFTER A MAIN MEMORY FAILURE

TECHNICAL FIELD

The present invention relates generally to a technique for enabling the operation of a computer system after a failure in which the contents of its main memory are lost and, more particularly, to a recovery technique called checkpointing in which information stored in the main memory (including some data stored in the form of a linked list) is periodically copied to another memory having an independent failure mode.

BACKGROUND OF THE INVENTION

Occasionally during the course of operation of a computer system, the contents of its main memory may become garbled or lost, due to power or transmission line interruption or other system malfunctions. Several techniques have been developed for returning the data structures in the computer memory to a recent consistent state after a failure occurs. In particular, checkpointing is a technique based on the principle of storing and periodically updating an extra copy (complete or incremental with a base) of one or more data structures on memory media having an independent failure mode. A survey of recovery techniques is given by J. S. M. Verhofstad in "Recovery Techniques for Database Systems", *Computing Surveys*, 10:2, pp. 167–195 (June 1978).

Different checkpointing schemes use different methods to periodically change the "extra" copy of the data structure (usually stored in a disc memory) to take account of changes in the main memory that occurred since the last checkpoint. For example, in a method called "update-in-place", to modify a disc page, a copy of that page is made and the copy is written to another unused disc page in a so-called "undo log". The original page is then modified in situ, hence the name "update in place". To "do" the modification, nothing more need be done; the new page on the undo log (containing the old copy) is later released. On the other hand, to "undo" the modification, the contents of the modified page are replaced with the contents of the page stored on the undo log. Update-in-place is thus biased toward *doing* modifications, since no further action is needed to keep disc pages after they have been modified. A more complete description of update-in-place is given in an article by J. Gray entitled "Notes on Data Base Operating Systems", in *Operating Systems—An Advanced Course*, ed. G. Seegmuller, Springer Verlag, pp. 393–481 (1978).

In some circumstances, an alternative checkpointing technique known as shadowing, which is biased toward undoing modifications, is preferred. In shadowing, a copy of a recent consistent state of the data structure is maintained in a read-only status on disc. To modify the contents of a disc page, a *copy* of that page is modified but then stored in a new page on disc. The original page remains untouched, and is thus called the "shadow". The modification is undone simply by freeing the new page; to "do" the modification, all pointers to the old (shadow) page are changed to point to the new page, and the old page is thereafter freed. Shadowing is described generally in an article by R. A. Lorie in "Physical Integrity in a Large Segmented Database", *TODS*, 2:1, pp 91–104 (March 1977).

While shadowing has several advantages, its wider acceptance has been hindered by its inability to deal efficiently with a data structure known as a "linked list", which is a series of items (such as memory pages) each of which includes both stored information and a pointer to the address of the next item (page) in the series. In particular, a problem arises when pointers are changed from an old shadow page to a new page, since the pointers are themselves stored on pages which have now changed, and must be updated. Modifications thus propagate, generally resulting in the need to recopy the entire linked list. Such mass recopying obviously decreases system efficiency, and seriously increases the difficulty of implementing a checkpoint by shadowing strategy for failure recovery. Also, while the recopying problem might be alleviated by prepending information accumulated in a second, read/write linked list since the last checkpoint to the original shadow copy of list, this would alter the sequence of the information. In some instances, it is preferable that the new information be added to the end (i.e., appended) of the existing list, to preserve its order.

In view of the foregoing, it is the broad object of the present invention to enable the use of a checkpoint shadowing strategy to recover information lost during a computer memory failure, in instances in which information is stored in the memory in a linked list structure. Specific objects are to permit updating of the read-only shadow copy of the linked list at each checkpoint without recopying the entire linked list, while maintaining the order in which the information is stored in the list.

SUMMARY OF THE INVENTION

In accordance with the present invention, a shadow copy of a linked list data structure is stored with read-only access in a disc (or other) memory having a failure mode independent of main memory. The linked list includes a series of items hereafter referred to as pages each of which (other than the last page) contains a pointer to the next page. The final page, called a "boundary page," is "prelinked" to an unused disc page which is the first page in a second read/write linked list which receives information generated between successive checkpoints. "Prelinking" means that the link made *before* the present checkpoint is used at the *next* checkpoint, when the two lists are concatenated. Because of the prelinking, when a new checkpoint is made, the information in the shadow can be updated simply by appending the second read/write linked list to the shadow copy, without the need for recopying. The order of the list is advantageously maintained intact. At each subsequent checkpoint, the last page in the shadow is again "prelinked" to an unused boundary page in which subsequent new information is written.

BRIEF DESCRIPTION OF THE DRAWING

The features and advantages of the present invention will be more readily appreciated by consideration of the following detailed description when read in light of the accompanying drawing in which.

DETAILED DESCRIPTION

Figure 1:
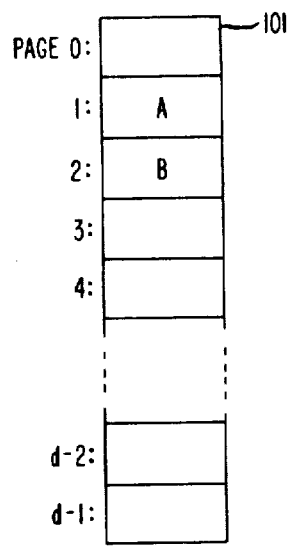
FIG. 1 diagramatically illustrates a computer disc memory abstracted as an array of d equal size pages and the locations of the system pages in that memory.

In the following description it is assumed that a computer system includes a relatively small and fast primary or "main" memory and a relatively large but slower disc memory. Main memory is usually random access and volatile; its contents can be lost should a power or hardware failure occur. Disc memory is usually block-access and nonvolatile; it has an independent failure mode, and its contents can be restored by a separate mechanism. As shown in FIG. 1, disc memory 101 is abstracted as an array of d equal size pages numbered 0, 1, 2 ... d−1. Disc memory space is allocated in pages, which are fungible, so that any page is as good as the next for storage purposes. Main memory is partitioned into page sized frames, so that data can be conveniently transferred, under control of a buffer manager. Normal operations performed by the manager include reading a page from disc memory into a main memory frame, and writing the contents of a main memory frame onto a disc page. If a failure should occur during a transfer between main memory and disc, the contents of the transferred page may be garbled.

Generally speaking, checkpointing by shadowing is a technique for guaranteeing the existence in disc memory of a progression of consistent states of the data structures within main memory. An existing checkpoint is maintained with read-only access until the succeeding checkpoint occurs. Since a disc page can be garbled even *during* a transfer from main memory to disc, a "certified write" operation can be used: when specifically requested, the buffer manager *either* correctly writes an entire page from main memory to disc, *or* generates an immediate failure indication. Once data for a new checkpoint is written on disc, pages used for the previous checkpoint can be reused. Thus, until a new checkpoint is completed, the existing checkpoint contains the data structures of interest.

One data structure that enables efficient memory management is called a linked list of pages, which is defined as a series of pages in which the last (or another arbitrarily positioned) item on each page is the page number of the next page in the series. Normally, the last item on the last page of the linked list is a null, indicating that there is no next page. This structure is particularly useful in mantaining a list (called a "free list") of free (unused) pages in the disc memory. While other uses for linked lists are possible, the free-page list will be used as an example for further description of the present invention.

Typically, a free-page list may be envisioned as a queue. To allocate a disc page for use, its address is obtained from the front of the queue, i.e., from the first page in the linked list. When a page becomes free for reuse, its address is appended to the rear of the queue, i.e., at the end of the addresses stored in the last page of the linked list. The present invention permits maintenance of a linked list, such as a free list, in an environment where a shadowing technique is used for recovery. It allows the linked list to be updated at each checkpoint without the need for wholesale recopying of pages in the list.

In accordance with the present invention, two linked lists of pages, called the read-only (ro) free-page list and the append-only (ao) freed-page list, are prelinked so that the append-only list may be appended to the read-only list at a checkpoint without violating the integrity of the shadow. The ro and ao lists both have a "shadow" state and a "current" state, the former representing the status of the memory at the last checkpoint, and the latter representing the status of the memory at some later time, after the computer system has performed some data manipulations but before the succeeding checkpoint. The ro list and the pointers that refer to its shadow state cannot be modified or changed in any way between checkpoints. However, the pointers that reference the current state of the ro list do change as the information in the list is used; as free pages are allocated from the front of the ro list, the pointer in effect "walks" through the list, as will be described below. The ao list is different; the shadow state ao list is empty, while the current ao list can be changed. Disc pages freed during computer system operation are appended to the current ao list. With this arrangement, a window of only two pages of main memory (the current ro and ao pages) is needed for accessing and maintaining the free page list.

At each checkpoint, the "nonwalked" part of the current ro list is combined with the current ao list. Heretofore, such combination would undesirably necessitate recopying of the entire shadow state ro list; this occurred because concatenation of the current ao list to the end of the nonwalked ro list required modification of the *last* page of the current ro list to point to the beginning of the current ao list. The modified last page could not be written to its old place on disc, because the read-only status of the shadow ro list would then be violated. Furthermore, if one were to copy the last page of the ro list, modify its pointer to effect the desired concatenation and write the copy to a *new* place on disc, the problem would persist, because the penultimate page of the ro list would now point to the unmodified copy, not the new one. Indeed, if this problem is pursued by copying the penultimate page of the ro list, modifying its pointer and writing this copy to another new place on disc, an inconsistency would arise in the second from last page of the ro list, which points to the penultimate page.

The efficiency of free page management enabled by the use of linked lists is illustrated by the compact set of pointers needed to describe the ro and ao lists. Specifically, the shadow read-only list is described by a pointer "roNext" to its front page, a pointer "roRear" to its rear page, and pointers "roNextOff" to the offset of the first item in the front page, "roLastOff" to the offset of the last item in "roRear" and a count "roN" of the total number of items in the list. The current read-only list is described by pointers "roNext" to the page of the next item, "roRear" to the rear page, "roNextOff" to the offset within "roNext" of the next item, "roRear" to the offset of the last item in "roRear" and a count "ro-LeftN" of the remaining number of items in the read-only list.

Similarly, few pointers are needed to describe the shadow and current ao lists. The shadow append-only list is characterized by its lone empty page, identified by pointer "aoFront". The current append-only list is described by its front page "aoFront", its rear page "aoRear", the offset "aoLastOff" of the last item appended to page "aoRear", and the total number "aoN" of items in the ao list. Prelinking in accordance with the present invention is assured by allocating the first page of the ao list and linking it to "roRear", the last page of the read-only list, before "roRear" became read only. It should be noted here that the counts roN and aoN are a convenient way of keeping track of the number of pages in the free and freed categories, so that a checkpoint can be triggered when the count of free pages on the read-only list is low.

The prelinking described above can best be fully understood by considering the three major operations involved in the checkpoint-by-shadowing strategy of the present invention, namely: (1) initialization, (2) recovery after a failure, and (3) normal operation; these operations are described in turn below.

Figure 2:
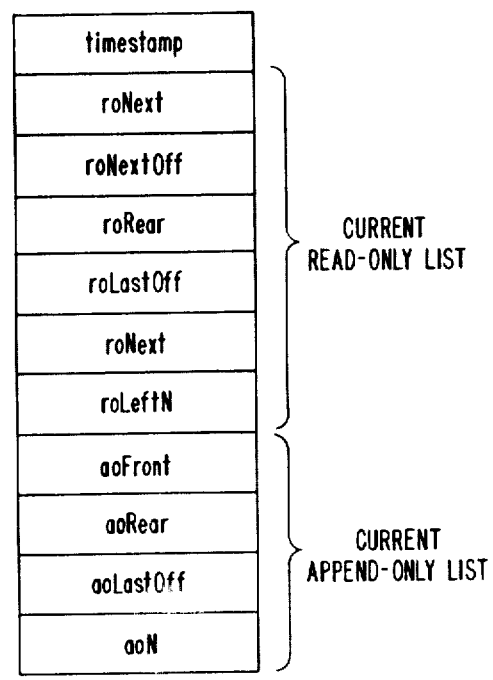
FIG. 2 shows some of the pointer values stored on a typical system page.

During initialization, two "system pages" (named "A" and "B") are created, each containing a timestamp indicating its time of creation and the pointer values illustrated in FIG. 2. The system pages reside in fixed disc locations (e.g., pages 1 and 2 of FIG. 1) so that they can easily be found after a failure. A preselected disc page (page 3 in this example) is the initially allocated first page of the append-only freed page list, while another disc page (e.g., page 4) contains the first page of the initial read-only free page list. Page 4 is written with a list of unused disc page numbers, beginning with page number 5. While each disc page can store N items, numbered 0 to N−1, only N−1 free page numbers are stored; the last (N−1) item on each page is reserved for a pointer, linking that page to the next page in the list. If the last page in the list is not full, it is padded with 0's. Pointers roNext and roRear identify the front and rear pages of the free page list thus constructed. In accordance with the invention, the last item of roRear is illustratively replaced with "3", prelinking the last page of the read-only list to the initially empty append-only freed page list that begins on disc page 3. Pointers aoNext and aoRear are both also set at 3, while pointer roNextOff is initially 0.

Figure 3:
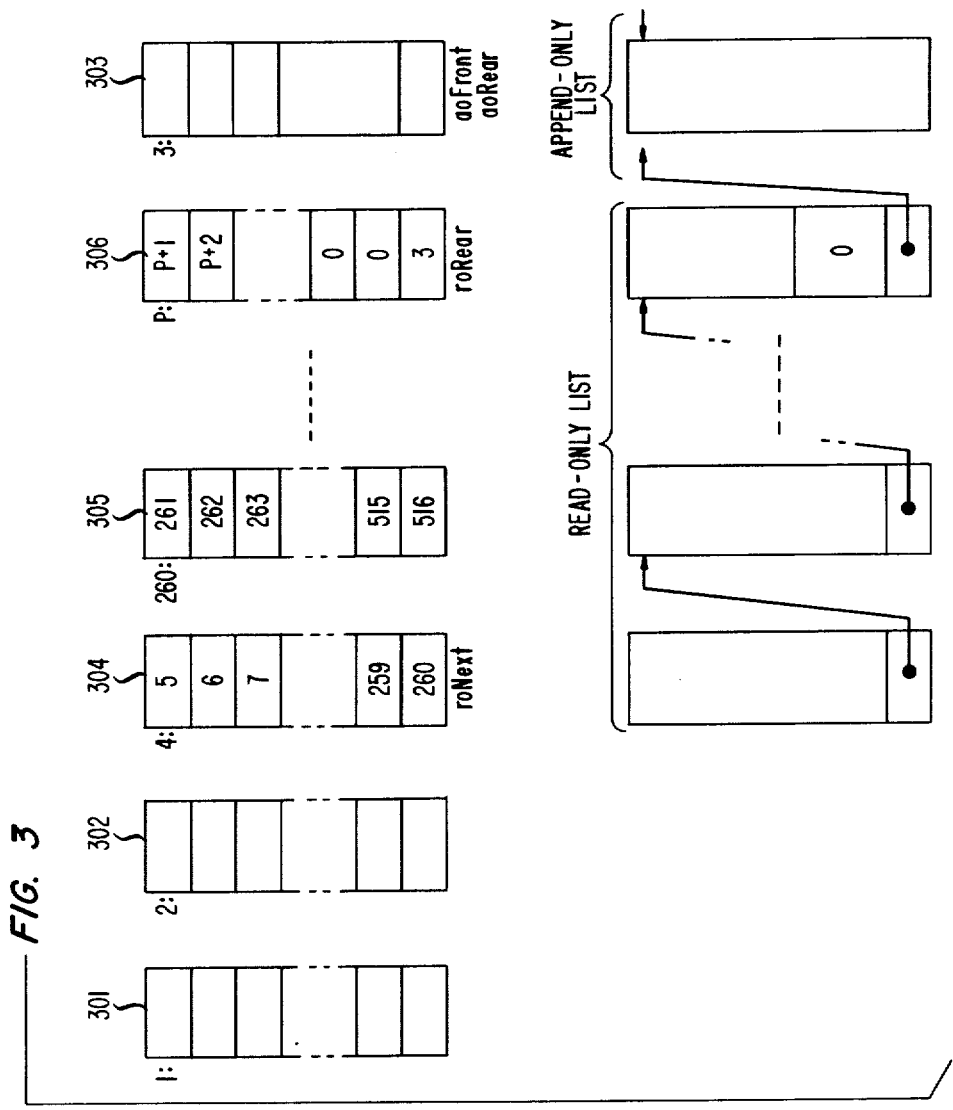
FIG. 3 is an illustration of the contents of certain pages of the disc memory after initialization showing the entry of items indicating the addresses of other unused pages in the disc memory.

The operation described above is illustratd in FIG. 3, which shows the disc status after initialization has been completed. Pages 1 and 2 (designated by numerals 301 and 302) each contain system pages A and B, respectively. Page 3 (reference numeral 303) is initially empty and is addressed by pointers aoFront and aoRear. Disc page 4 (reference numeral 304) contains the first page 5 in the read-only list; a total of N−1 (255 in this example) addresses of unused disc pages are stored on this page. The last entry on disc page 4 is a pointer to disc page 260 (reference numeral 305) which contains the next portion of the read-only list. In a similar fashion, the last entry on each succeeding page in the read-only list links that page to the disc page which stores the next portion of the list. The last page in the list (reference numeral 306) is designated page P, and is addressed by pointer roRear. The portion of this page that follows the last free page address is padded with 0's. However, the final entry on page P is the prelinking address to disc page 3 on which the append-only freed page list begins.

The "recover" operation of the present invention serves three separate purposes: to set up the free page list for the first time after the initialization described above; to recover a consistent main memory state after a failure; and to complete the checkpoint operation described below. During recovery, both system pages A and B are read into main memory from the predetermined disc locations (e.g. pages 1 and 2 ) reserved for them. The more recent system page (or either one of the pages if both have the same timestamp, as after initialization) is taken as defining the shadow state of the memory; that page is kept, while the other page is updated in accordance with the checkpoint process described below. Thereafter, a pointer to roNext, the disc page containing the beginning of the current free page list, is obtained from the new system page, and that page (roNext) is read into main memory, whereupon "normal" operation may begin.

The "Normal" operation itself consists of several operations, referred to as "Allocate", "Free", "IsLow" and "Count".

The "Allocate" operation is used to obtain the address of the next unused disc page from the free page list, using pointers roNext and roNextOff. First, any 0's found in the roNext page are skipped over. Then, a local variable r is set to the value of the nonzero item at offset roNextOff. The variable r is returned at the completion of the "Allocate" operation, yielding the desired address. If all the free-page items on roNext have been used, roNext is updated using the linking address written in the final position on the page. roNextOff is then reset to zero, and the contents of new page (roNext) in the free page list is read into main memory. At this point, the just finished page (previous value of roNext) is available for reuse. The "Free" operation described below is used to add the address of that page to the end of the append-only freed page list. If any initial 0's are contained in the *new* roNext, they too are skipped and roNextOff is appropriately advanced, so that the next nonzero item on the new page (roNext) is the address of another unused disc page.

The "Free" operation appends the address of a freed disc page to the end of the freed page list. A one-page buffer in main memory is used in this operation to hold freed page numbers. When a full page of numbers has been accumulated (i.e., when the value of aoLastOff, the offset of the last item added to the buffer, reaches N−1) or when a checkpoint occurs, the buffer is written to disc page aoRear. Specifically, to free a page at address X, aoLastOff is incremented and X is inserted at the end of the buffer, provided that aoLastOff is less than N−1 (the number of items which may be stored in each disc page). When the buffer contains N−1 items, its contents are written to disc page aoRear, and aoLastOff is then reset to zero.

Each "last" page in the freed page list is linked to what will be the next page of that list, using the "Allocate" operation described above. This accomplishes the allocation and prelinking of the present invention, and occurs each time a *first* item is added to the buffer, indicating that a new page is being added to the freed page list. The address that prelinks aoRear to what will become the next page in the freed page list is inserted as the last item in the buffer. Thus, when the buffer contents are transferred to disc (at the next checkpoint or after overflow detection), a link to the succeeding page is in place. If desired, the linking address can be at a predetermined location on each disc page other than the last item.

The operation named "Count" is used to query the number of free pages remaining in the read-only list. This is accomplished by adding the pointers roLeftN and aoN. "IsLow" is an operation for polling to determine if free space is low. It compares (1) the value of roLeftN with a constant K1, or (2) the difference between roN and roLeftN with another constant K2. If a positive comparison occurs, a checkpoint is initiated. Both K1 and K2 are design parameters that depend upon the type of file system being used.

Figure 4:
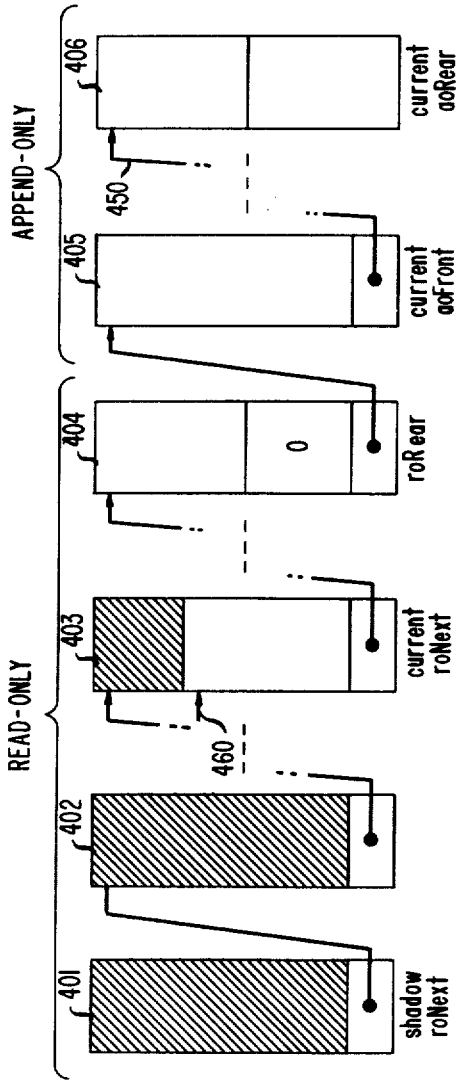
FIGS. 4 and 5, respectively, illustrate the read-only and append-only free page lists before and after a checkpoint operation is performed in accordance with the present invention.
Figure 5:
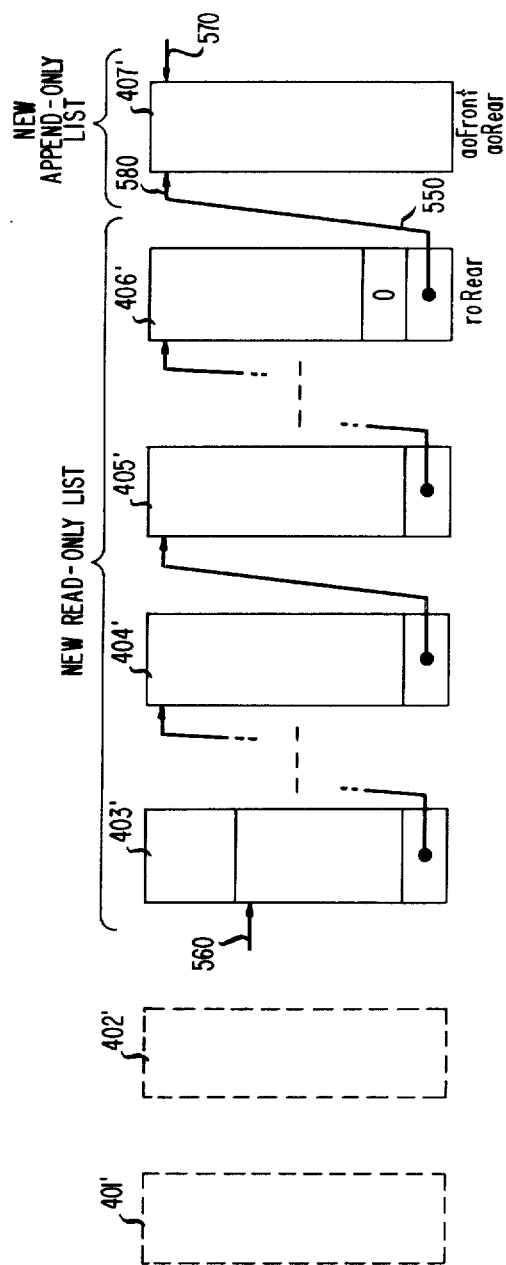

The "Checkpoint" operation that creates new read-only and append-only lists and then resumes normal operation may occur regularly, at predetermined intervals, or when the "IsLow" operation indicates that insufficient free page addresses exist on the read-only list. FIG. 4 illustrates the free page list just before a "Checkpoint", while FIG. 5 shows the list after the "Checkpoint" operation has been completed. In FIGS. 4 and 5, reference numerals 401-406 indicate the same memory pages. However, since the contents of some of these pages can change between successive checkpoints, the reference numerals for FIG. 5 include the prime symbol (') to facilitate differentiation in the following description. It is also to be understood that only some pages in the read-only and append-only lists have been shown, and additional pages in both lists have been eliminated for ease of explanation, as shown by the "broken" interconnecting arrows. During the "Checkpoint" operation, the unused part of the last page in the append-only list (page 406 in FIG. 4) is padded with 0's (as shown in page 406' of FIG. 5) and that page is written to disc. It should be noted here that the successor page to page 406 (i.e., page 407' in FIG. 5) has already been preallocated (using the "Free" and "Allocate" operations described above) and is thus prelinked to page 406', as indicated by the connection identified by reference numeral 550. The new read-only list (FIG. 5) is defined having a front page (403') determined by the current roNext pointer labeled with reference numeral 560, which is the same as the roNext pointer (460) in FIG. 4. Its rear page 406' is determined by the current aoRear pointer, labeled with reference numeral 450. The addresses of disc pages which have been added to the append-only page list since the last checkpoint and stored on pages 405-406 are thus appended to the read-only list which contain addresses of pages still unused. The new append-only list is an intially empty page (407') with pointers aoRear (reference numeral 570) and aoFront (reference numeral 580) which are identical. At the end of the checkpoint operation, the older of the two system pages is timestamped and written to disc by a certified write.

The checkpoint operation just described can be summarized considering the pointer values in the old and new system pages, which represent the status of the free page lists before and after updating, respectively. In FIG. 4 pointer roNext (reference numeral 460) represents the storage location in disc of the address of the next unused disc page. This pointer began at the previous checkpoint at the beginning of disc page 401 and "walked through" pages 401, 402 and a portion of 403 before assuming the position shown in FIG. 4. When roNext moved from page 401 to page 402, roNextOff had a value (N−1) one less than the number of items stored on each disc page. When page 401 became empty, its address was added at the end of the append-only list. The position of roNext is preserved across the checkpoint, so that the first address of an available page obtained from disc page 403' is the same after the checkpoint is completed as it would have been prior to checkpointing. Each remaining page in the list of FIG. 4 is linked to the following page and the final page identified by pointer aoRear is prelinked to the succeeding aoRear after the checkpoint. This connection is illustrated by reference numeral 550 in FIG. 5. Immediately after the checkpoint operation, pointers aoFront and aoRear are identical. As normal operation proceeds and the addresses of unused disc pages that become free are added to the append-only list, pointer aoRear moves through page 407'. As explained previously, new pages to hold more items are added to the append-only list using the "Allocate" operation described above, in each instance linking the new page to a succeeding page.

Numerous advantages accrue from the present invention beyond the fact that copying of any part of a free list is avoided during the "Checkpoint" and "Recover" operations. First, only two pages of the free list, namely, roNext and aoRear need be held in the main memory at any time. The system pages are written from main memory to disc only at the end of a checkpoint operation, not every time its contents are changed. The arrangement allows a consistent memory state that existed at the previous checkpoint to be recovered, and maintains the order of the list.

While the foregoing description assumes a computer system arranged to handle one process at a time, checkpointing is also useful in instances in which many processes share access to the free list and other similar data structures. To guarantee that each user sees a consistent state of that structure, access to the structure may be synchronized by a mutual exclusion technique. For example, a scheduler lock (like a monitor lock described in "Experiences with Processes and Monitors in Mesa", *CACM*, 23:2, February 1980, by B. W. Lamspon and D. D. Redell) can be associated with the free list module, and two scheduler functions, "Enter" and "Leave" used for requesting and releasing that lock, respectively. Since "Allocate" and "Free" are mutually recursive, and "Checkpoint" calls "Recover", some problems arise. To resolve potential deadlock, an operation called "Enter" is defined to realize when the entering process already holds the lock. A "Leave" operation, which releases the lock, is not called unless the calling depth, maintained by a global variable of the free list module, returns to zero.

Various modifications and adaptations of the present invention will be readily apparent to those skilled in the art. Accordingly, it is intended that the invention be limited only by the appended claims. For example, while the preceding discussion concentrated on prelinking of lists containing addresses of unused disc pages in a computer system, the lists could easily include any other type of information needed in a computer system.

What is claimed is:

1. A method of restoring the memory of a computer system to a recent consistent state after a memory failure including the steps of:
   (a) forming a read-only shadow copy of a data structure in said computer memory, said structure including information stored in a first series of linked pages, each page of said first series other than the last page containing a pointer to the next page in the series,
   (b) storing said read-only shadow copy in a second memory having a failure mode independent of the failure mode of the main memory of said computer, and
   (c) periodically constructing a new read-only shadow copy to replace the previous shadow copy, said new copy incorporating additional information accumulated since the previous shadow copy was formed,
   characterized in that (d) said forming step includes inserting a pointer on said last page of said first series of pages to the first page of a second series of pages containing said additional information, and (e) said constructing step includes appending said second series of pages to said first series of pages.

2. The method defined in claim 1 wherein said information stored in said first series of linked pages includes a first list of the addresses of free pages in said second memory which are available for use at the time said read-only shadow copy is formed, and said additional information includes a second list of the addresses of pages in said second memory which become free for use after said shadow copy is formed.

3. The method defined in claim 2 further including the steps of:

allocating free pages for use in the operation of said computer system from addresses obtained from the beginning of said first list, and adding addresses of newly freed memory pages at the end of said second list.

4. The method defined in claim 3 wherein said method further includes:

computing the number of free pages in said first list, comparing said number of free pages to a preselected threshold, and wherein said constructing step occurs when said number of free pages in said first list is below said preselected threshold, or at a predetermined time interval, whichever occurs sooner.

5. A method of enabling the operation of a computer system after a main memory failure including the steps of:

(a) forming a read-only shadow copy of a linked list data structure in a memory having a failure mode independent of said main memory, said linked list data structure including information stored in a first series of linked pages, each page of said first series other than the last page containing a pointer to the next page in the series, and (b) periodically constructing a read-only shadow copy to replace the previous shadow copy by appending to said first series of pages additional information from a second linked series of pages, said additional information being accumulated since the previous shadow copy was formed, characterized in that said forming step includes (c) inserting a pointer on said last page of said first series of pages, prelinking said last page to the first page of said second linked series of pages.

6. The method defined in claim 5 wherein said information stored in said first series of pages represents a list of the addresses of free pages in said independent failure mode memory at the time of said constructing step, and said additional information stored in said second series of pages represents a list of the addresses of pages in said independent failure mode memory freed for use since the last occurrence of said constructing step.

7. The method defined in claim 6 wherein said constructing step is performed when the number of said addresses in said list of addresses of free pages reaches a preset minimum.

8. The method defined in claim 7 wherein said inserting step includes:

(a) obtaining the address of a free page from the beginning of said list of addresses of free pages (b) storing information representing said address in a preselected location on said last page, and (c) modifying a pointer indicating the beginning of said free page list to point to the next address of a free page.

9. A method of performing checkpoints to preserve a recent consistent state of a data structure in a computer memory and enable its recovery after a memory failure, said data structure including a series of pages each of which is linked to the next page, said method including the step of:

(a) updating information on a system page stored during the previous checkpoint to reflect subsequent changes in said data structure, (b) storing the updated information in a memory having a failure mode independent of the failure mode of said main memory, and (c) repeating steps (a) and (b), characterized in that said series of pages includes a read-only portion, and an append-only portion and said updating step includes:

(1) appending information stored in said append-only portion which reflects said subsequent changes to said read-only portion to form the next read-only portion, and (2) prelinking the last page of said next read-only portion to the first page of the next append-only portion.

10. The method defined in claim 9 wherein said updating step further includes inserting a time-indication on said system page.

11. The method defined in claim 9 wherein said information stored on said system page includes pointers to the beginning and end of said read-only and append-only portions.

12. The method defined in claim 9 wherein said prelinking step includes inserting an indication of the address of said first page in a predetermined location on said last page.

13. The method defined in claim 9 further including the steps of:

(a) writing the addresses of unused pages of said independent failure mode memory in said read-only portion, and (b) writing the addresses of pages of said independent failure mode memory which have become free since the last updating step in said append-only portion.

14. The method defined in claim 13 further including the steps of allocating unused pages for use in the operation of said computer system in accordance with addresses obtained from the beginning of said read-only portions, and adding addresses of newly freed memory pages at the end of said append-only portion.

15. The method defined in claim 14 wherein said method further includes the step of:

comparing the number of addresses of unused pages in said read-only portion to a preselected number, and wherein said updating and storing steps are repeated at periodic intervals, or sooner if said number of unused page addresses remaining in said read-only portion falls below said preselected minimum.

* * * * *